United States Patent Office 3,271,579
Patented Sept. 6, 1966

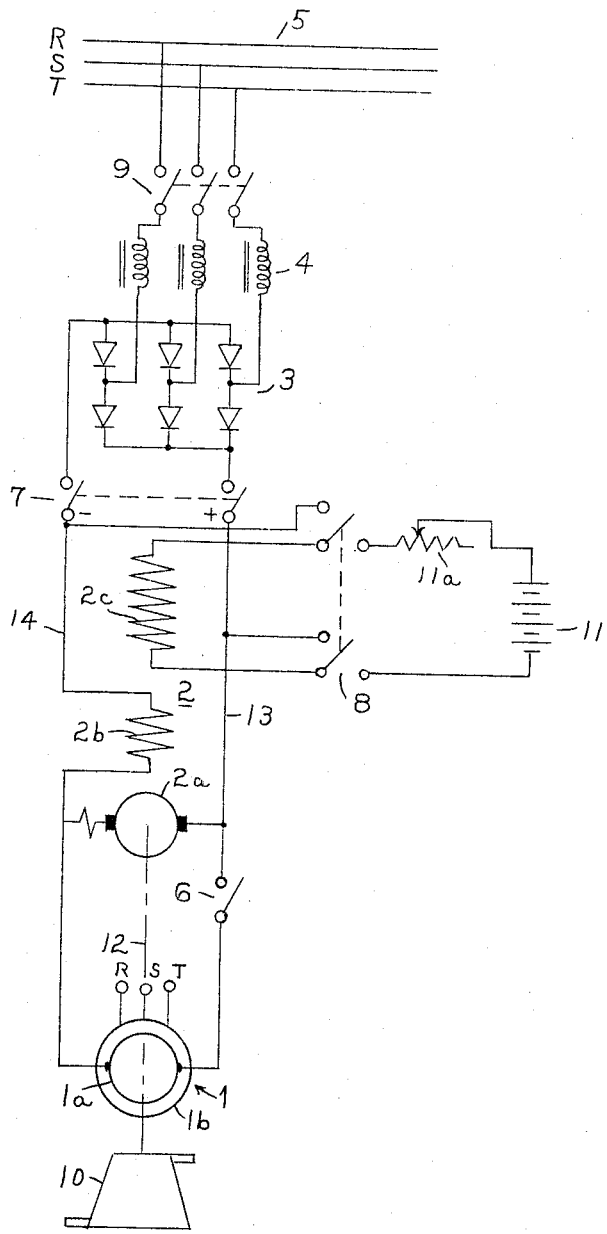

3,271,579
STARTING A GAS TURBINE BY USING AN EXCITER DYNAMO AS THE STARTING MOTOR
Oskar Erismann, Baden, Switzerland, assignor to Aktiengesellschaft Brown, Boveri & Cie, Baden, Switzerland, a joint-stock company
Filed Oct. 8, 1963, Ser. No. 314,801
Claims priority, application Switzerland, Nov. 14, 1962, 13,332/62
5 Claims. (Cl. 290—32)

The present invention relates to power groups comprising an electrical alternating current synchronous generator having an auxiliary direct current excitation generator for supplying current to the magnetic field producing, i.e., excitation windings of the rotor element of the synchronous generator, the latter together with the rotor element of the direct current exciter generator being driven by a prime mover such as a gas turbine or internal combustion engine. More particularly, the present invention is directed to an improved arrangement for starting the power group and wherein the exciter generator is used temporarily as a starting motor. Arrangements of this general type are already known and wherein the exciter generator is operated as a starting motor by reversing the connections. In the known systems the current supply for starting is obtained either from a battery which of course requires that a battery charging apparatus be also included so as to periodically recharge the battery, or from a diesel-electric generator group. The expense involved for this supplementary equipment is considerable but can be reduced considerably in accordance with the present invention.

In general, the present invention is characterized by an arrangement wherein the armature of the exciter generator is temporarily disconnected from the excitation windings of the synchronous generator and is connected in series with an auxiliary field winding to thus constitute a series motor, the series connected auxiliary field winding and the armature being supplied with power from a rectifier which is connected to an alternating current supply source. Moreover, as an additional feature, a choke can be connected into the alternating current side of the rectifier so as to control the amount of current which flows through the armature of the exciter generator while the latter is being utilized, during the start-up, as a direct current series motor.

One suitable embodiment of the invention is disclosed in the accompanying drawing which is an electric schematic showing the relationship between the various elements.

With reference now to the drawing, the alternating current synchronous generator is indicated at 1. Its 3-phase stator winding is indicated at 1b and is shown connected to a 3-phase network, the individual phases of which are indicated by R, S and T respectively. The rotor element is indicated at 1a and is provided with the excitation windings for producing the necessary rotating magnetic field.

The exciter generator for supplying direct current power to the windings on rotor 1a is indicated at 2, its rotor element being designated 2a and its normally utilized field winding being designated by 2c. The direct current output from generator 2 is connected through a switch 6 to the windings on rotor 1a. The exciter generator armature 2a together with the synchronous generator rotor 1a are driven by the prime mover, which in the illustrated embodiment is constituted by a gas turbine 10. The shafting or coupling between these three elements is illustrated schematically at 12.

The field winding 2c of generator 2, normally used when the power group is operating, is itself supplied with direct current from a suitable external source indicated on the drawing as a battery 11, the connections between field winding 2c and the battery including a variable resistance 11a for current regulation and a switch 8 for disconnecting winding 2c from its normal source of current. As shown, switch 8 is of the two position type wherein after opening the circuit from battery 11 it can be used to connect field winding 2c across circuit conductors 13, 14.

Exciter generator 2 is also provided with an auxiliary field winding 2b which is utilized to supply field current to generator 2 only when the latter is temporarily operated as a series motor in order to start up the power group. It will be seen from the drawing that the auxiliary field winding 2b is connected in series with armature 2a relative to the circuit conductors 13, 14 which lead through a switch 7 to a source of supply constituted by the direct current output of a 3-phase rectifier group 3. The phase connections to these rectifiers, on the alternating side, i.e., between the rectifiers and the 3-phase alternating current supply network constituted by lines R, S and T include the series connected chokes 4 and the 3-phase switch 9.

The apparatus in accordance with invention is operated in the following manner. In order to start the prime mover, i.e., gas turbine 10, switch 6 is shifted to its open position thus disconnecting the synchronous generator rotor 1a from the exciter generator 2. Switch 8 is also opened to thus disconnect the field winding 2c from its normal source of power represented by battery 11. Switches 7 and 9 are now moved to their closed positions which serve to connect the input sides of the rectifier group 3 through the chokes 4 to the auxiliary alternating current network 5 and to connect the direct current output side of the rectifier group to the circuit conductors 13, 14. The direct current is passed through the auxiliary field winding 2b and armature 2a in series, and thus the latter will now operate as a direct current series motor and thus impart a starting torque to the shafting 12 and hence to the rotor of turbine 10 and the rotor 1a of the synchronous generator, which at this time is operating without any excitation current since switch 6 is open.

The chokes 4 which are of the iron core type enable a highly amplified starting current to flow at the beginning of the start-up operation due to magnetic saturation of the choke cores and consequently a reduced impedance. Hence there is a maximum starting torque available at the series motor 2. The voltage drop across the chokes decrease with increasing speed of the power group which is accompanied by a rising back E.M.F. in the rotor 2a. Accordingly, the impedance of the choke rises and the starting current, which is limited by the choke, decreases proportionally. On attaining full speed of the power group 1, 10—switches 7 and 9 are reopened and the current to the rotor 2a is thereby cut off from the rectifier supply source. At the same moment, the field winding 2c is again connected to the regulated excitation voltage source 11 by reclosing switch 8. The direct current machine 2 thenceforth operates as a normal direct current excitation generator.

Instead of cutting out the excitation winding 2c, an additional reduction of the exciting current is possible by effecting a corresponding increase in the resistance 11a. This gives a better utilization of the two excitation windings 2b and 2c. Moreover, if the excitation winding 2c is cut off from the supply source 11 by shifting switch 8, the latter can then serve to reconnect winding 2c across the circuit conductors 13, 14 so that winding 2c will lie in parallel with the series connected winding 2b and rotor 2a when the machine 2 is operated as a motor during the start-up.

The invention has the advantage of extreme simplicity. The use of chokes enables not only a simple current transformation to be made, but also the maintaining of a large starting current and hence starting torque, at the commencement of the start-up operation, this starting current being automatically and progressively lowered by a corresponding progressive increase in the impedance of the choke on approaching normal service speeds, all without requiring any additional equipment. At the beginning of the start-up operation, a poor cos φ must be accepted, but this has no practical significance since the start-up process occurs relatively seldom and is only of short duration, usually about 5 minutes.

Furthermore, by way of conclusion, while the prime mover for the power group has been described and illustrated as a gas turbine, the inventive concept can be applied equally as well when the synchronous generator is driven by a diesel engine.

I claim:

1. An arrangement for starting up a power group comprising a prime mover such as a gas turbine coupled to a synchronous generator for driving the rotor element thereof and an exciter generator for supplying field current to the rotor of said synchronous generator, the rotor of said exciter generator being also coupled to said gas turbine, the improvement wherein a rectifier system is supplied from an alternating current source, there being a variable impedance choke in the circuit connections between said rectifier system and its alternating current supply source and wherein for starting purposes the direct current output from said rectifier system is supplied to the rotor of said exciter generator in series with an auxiliary field winding thereof whereby to cause it to operate temporarily as a series motor, there being a switch provided between the rotor of said exciter generator and the rotor of said synchronous machine for disconnection during the start-up and a second switch between the direct current output side of said rectifier system and the rotor of said exciter generator which is closed only during the start-up.

2. In an arrangement for starting up a power group comprising a prime mover such as a gas turbine coupled to a synchronous generator for driving the rotor element thereof and an exciter generator for supplying field current to the rotor of said synchronous generator, the rotor of said exciter generator being also coupled to said gas turbine, the combination comprising a regulatable source of direct current external to said exciter generator for supplying a normally used field winding of said exciter generator with current during normal running operation of said power group, a rectifier system connected through variable impedance choke means to a source of alternating current, circuit means including switch means therein closable only during the start-up for connecting the direct current output from said rectifier system to the rotor of said exciter generator in series with an auxiliary field winding thereof whereby to cause it to operate temporarily as a series motor for the start-up, and further switch means in the electrical circuit connections between the rotor of said exciter generator and the rotor of said synchronous machine for disconnection during the start up.

3. A start-up arrangement for a power group as defined in claim 2 wherein said variable impedance choke means include a core saturable at the beginning of the start-up operation so as to provide a low impedance enabling a high starting current to be supplied from the direct current output from said rectifier system to said exciter generator then operating temporarily as a series motor, said choke impedance then being progressively increased by core desaturation upon an increase in speed of the power group.

4. A start-up arrangement for a power group as defined in claim 2 wherein said regulatable source of direct current for supplying the field winding of said exciter generator used during normal running of said power group is connected to said field winding by circuit means including a disconnection switch.

5. A start-up arrangement for a power group as defined in claim 4 wherein said disconnection switch in the circuit means between said regulatable source of direct current and said normally used field winding of said exciter generator is so constructed as to enable said normally used field winding to be reconnected for energization from the direct current output from said rectifier system.

References Cited by the Examiner
UNITED STATES PATENTS

| | | | |
|---|---|---|---|
| 1,585,831 | 5/1926 | Bradford | 290—46 |
| 1,655,231 | 1/1928 | Livingston | 290—11 X |
| 2,339,903 | 1/1944 | Alexander | 290—36 X |
| 2,374,060 | 4/1945 | Weybrew | 290—16 |
| 2,395,443 | 2/1946 | Frauenfelder et al. | 290—32 |
| 3,175,095 | 3/1965 | Denniston | 290—46 X |

ORIS L. RADER, *Primary Examiner.*

G. SIMMONS, *Assistant Examiner.*